Patented Aug. 7, 1945

2,380,998

UNITED STATES PATENT OFFICE 2,380,998

ORGANOSILICON HALIDES

Murray M. Sprung, Scotia, and William F. Gilliam, Schenectady, N. Y., assignors to General Electric Company, a corporation of New York No Drawing. Application March 4, 1942,
Serial No. 433,292

9 Claims. (Cl. 260—607)

The present invention relates to the preparation of organosilicon halides. It is more particularly concerned with the preparation of hydrocarbon-substituted halogenosilanes having at least one hydrogen atom attached directly to the silicon. It is specifically concerned with the preparation of organosilicon halides having the formula $RSiHX_2$ wherein R represents a lower alkyl radical of not more than three carbon atoms and X represents a halogen atom, specifically a chlorine or bromine atom.

In the copending application of Eugene G. Rochow, Serial No. 412,459, filed September 26, 1941, and assigned to the same assignee as the present invention, is disclosed and broadly claimed the method of preparing organosilicon halides, more particularly hydrocarbon-substituted silicon halides, which comprises effecting reaction between silicon and a hydrocarbon halide. The copending application of Eugene G. Rochow and Winton I. Patnode, Serial No. 412,460, filed September 25, 1941 and assigned to the same assignee as the present invention is directed specifically to a method of preparing hydrocarbon-substituted silicon halides, e. g., methyl silicon chlorides (methylchlorosilanes) wherein is utilized a solid, porous, silicon-metallic catalyst contact mass of the kind disclosed and claimed in the copending application of Winton I. Patnode, Serial No. 412,-461, also filed September 26, 1941, and assigned to the same assignee as the present invention.

When an alkyl halide, for example, methyl chloride is passed over heated silicon or silicon-copper alloy as described in the above mentioned Rochow application, there is obtained a complex mixture of liquid products containing various silicon derivatives such as methylchlorosilanes silicon tetramethyl, silicon tetrachloride, and trichlorosilane. Only small amounts, less than about 3 per cent, of methyldichlorosilane, $CH_3SiHCl_2$, have been found in the liquid reaction products of methyl chloride and silicon.

Methyldichlorosilane, which boils at about 41° C., has been found to be particularly effective, alone or mixed with other hydrocarbon-substituted chlorosilanes, as a water-proofing agent for cloth, paper, etc., when applied in accordance with the process described and claimed in the copending application of Winton I. Patnode, Serial No. 365,983, filed November 16, 1940, and assigned to the same assignee as the present invention. Its use for this and other purposes, however, has been limited primarily because no way has been known for producing this particular derivative of silicon in commercially useful quantities.

An object of this invention is to provide a process for producing monoalkyldihalogenosilanes in useful quantities. A further object of this invention is to provide a method of increasing the yield of monoalkyldichlorosilanes, such as methyldichlorosilane, methyldibromosilane, ethyldichlorosilane, etc., obtained from the reaction between silicon and an alkyl halide such as methyl chloride, methyl bromide, ethyl chloride, etc.

These and further objects of our invention, which will become apparent from the following description of the invention, are attained by mixing hydrogen with the alkyl halide gas or vapor before it is brought into contact with the heated silicon or silicon-metallic catalyst contact mass. The hydrogen may be mixed with the halide in any suitable proportions. For convenience, it is believed best to work with substantially equivalent molar proportions of the two gases.

In order that those skilled in the art better may understand how the present invention may be carried into effect, the following illustrative examples are given:

Example 1

(A) A quartz reaction tube was filled with pellets of a silicon-copper contact mass composed of 80 per cent silicon and 20 per cent copper which had been heated in a hydrogen atmosphere at 1050° C. in accordance with the teachings of the Patnode application Serial No. 412,461. The tube was heated to 390° C. and methyl chloride gas was passed over the heated contact mass for 13 hours at the rate of 30 c. c. of gas per minute. The condensable reaction products were collected in a trap cooled by a mixture of dry ice and acetone. The unreacted methyl chloride and other highly volatile products boiling at temperatures below 25° C. were removed from the condensate by distillation and the remaining liquid was fractionated in a precision fractioning column. It contained only a trace of methyldichlorosilane, and consisted essentially of dimethyldichlorosilane, methyltrichlorosilane, and small amounts of other chloro- and methylchlorosilanes.

(B) Example I (A) was repeated using the same apparatus and procedure except that dry hydrogen gas was mixed with the methyl chloride gas prior to the reaction. The mixture was introduced into the tube at the rate of 40 c. c. hydrogen and 30 c. c. methyl chloride gas per minute. The liquid condensate remaining after distillation to remove the more volatile constituents boiling below 25° C contained about 15 per cent methyldichlorosilane, in addition to dimethyldichlorosilane and methyltrichlorosilane and small amounts of other chloro- and methylchlorosilanes.

Example II (A) A quartz reaction tube was filled with the same type of silicon-copper contact mass as was used in Example I. Methyl chloride gas, at the rate of 60 c. c. per minute, was passed over the silicon-copper contact mass held at a temperature of 390° C. The reaction products collected in a trap cooled by a dry ice-acetone mixture were distilled to remove unreacted methyl chloride and the residue was carefully fractionated. This residue was found to contain less than 1 per cent methyldichlorosilane.

(B) A mixture of methyl chloride and hydrogen was substituted for the methyl chloride used in part A of Example II. The mixture was passed over the contact mass at the rate of 60 c. c. methyl chloride and 50 c. c. hydrogen per minute. The residue remaining after the condensate had been distilled to remove the low boiling methyl chloride was found to contain over 17 per cent methyldichlorosilane having a boiling range of 39.8–41.3° C.

It is to be understood of course by those skilled in the art that our invention is not limited to the specific alkyl halide used in the above illustrative examples. Other lower alkyl halides containing not more than 3 carbon atoms which may be used to produce corresponding organosilicon halides containing hydrogen attached to the silicon are the ethyl and propyl chlorides and bromides.

Likewise, the invention is not limited to the specific temperature or metallic catalyst (if any) used in the above examples. In general, the reaction temperature will vary with, for example, the particular hydrocarbon halide employed and the particular catalyst (if any) used. A contact mass of a silicon-copper alloy is preferred although satisfactory results may be obtained without the use of a catalyst. Examples of catalytic metals, other than copper, which may be employed, are nickel, tin, antimony, manganese, silver, and titanium.

What we claim as new and desire to secure by Letters Patent of the United States is:

1. The method which comprises effecting reaction between heated silicon and a gaseous mixture of hydrogen and an alkyl halide selected from the group consisting of alkyl chlorides and alkyl bromides containing not more than three carbon atoms in the alkyl radical.

2. The method which comprises effecting reaction between heated silicon and a gaseous mixture of hydrogen and an alkyl halide in substantially equimolecular proportions, the said alkyl halide being selected from the group consisting of alkyl chlorides and alkyl bromides containing not more than three carbon atoms in the alkyl radical.

3. The method which comprises effecting reaction between heated silicon and a gaseous mixture of hydrogen and an alkyl halide in substantially equimolecular proportions, the said alkyl halide being selected from the group consisting of alkyl chlorides and alkyl bromides containing not more than three carbon atoms in the alkyl radical, the said reaction being carried out in the presence of a metallic catalyst.

4. The method which comprises effecting reaction between heated silicon and a gaseous mixture of hydrogen and an alkyl halide in substantially equimolecular proportions, the said alkyl halide being selected from the group consisting of alkyl chlorides and alkyl bromides containing not more than three carbon atoms in the alkyl radical, the said reaction being carried out in the presence of a copper catalyst.

5. The method which comprises effecting reaction between the silicon component of a heated solid porous mixture of silicon and copper and a gaseous mixture of hydrogen and methyl chloride.

6. The method which comprises effecting reaction between the silicon component of a heated solid porous mixture of silicon and copper and a gaseous mixture of hydrogen and methyl chloride in approximately equimolecular proportions.

7. The method which comprises effecting reaction between a substantially equimolar mixture of hydrogen and methyl chloride and the silicon component of a solid porous mixture of silicon and copper at a temperature of about 390° C.

8. The method of increasing the amount of methyldichlorosilane formed during the reaction between heated silicon and methyl chloride which comprises mixing a substantial quantity of hydrogen with the methyl chloride before the methyl chloride is brought into contact with the silicon.

9. The method of increasing the proportion of methyldichlorosilane in the reaction products obtained by contacting methyl chloride with silicon at an elevated temperature in the presence of a copper catalyst which comprises mixing a substantially equimolecular amount of hydrogen with the methyl chloride before the methyl chloride reactant is reacted with the silicon.

MURRAY M. SPRUNG.
WILLIAM F. GILLIAM.